(12) United States Patent
Finger et al.

(10) Patent No.: US 9,925,712 B2
(45) Date of Patent: Mar. 27, 2018

(54) BLOW MOULDING MACHINE WITH CHANGING ROBOT AND METHOD OF OPERATING IT

(71) Applicant: KRONES AG, Neutraubling (DE)

(72) Inventors: Dieter Finger, Neutraubling (DE); Florian Geltinger, Donaustauf (DE); Gerhard Schwoed, Alteglofsheim (DE); Klaus Voth, Obertraubling (DE)

(73) Assignee: KRONES AG (DE)

( * ) Notice: Subject to any disclaimer, the term of this patent is extended or adjusted under 35 U.S.C. 154(b) by 229 days.

(21) Appl. No.: 14/541,373

(22) Filed: Nov. 14, 2014

(65) Prior Publication Data
US 2015/0145179 A1    May 28, 2015

(30) Foreign Application Priority Data
Nov. 26, 2013    (DE) .......................... 10 2013 113 076

(51) Int. Cl.
*B29C 49/42*    (2006.01)
*B29C 49/48*    (2006.01)
(Continued)

(52) U.S. Cl.
CPC .............. *B29C 49/36* (2013.01); *B29C 49/48* (2013.01); *B29C 49/78* (2013.01); *B29C 49/06* (2013.01);
(Continued)

(58) Field of Classification Search
CPC ..... B29C 31/006; B29C 33/306; B29C 49/30; B29C 49/36; B29C 49/4205;
(Continued)

(56) References Cited

U.S. PATENT DOCUMENTS

| 5,302,105 A | 4/1994 | Bertleff .......................... 425/190 |
| 8,424,359 B2 | 4/2013 | Theis et al. ...................... 72/420 |

(Continued)

FOREIGN PATENT DOCUMENTS

| AT | 503196 | 8/2007 | ............ B21D 43/24 |
| CN | 102029706 | 4/2011 | ............ B29C 49/42 |

(Continued)

OTHER PUBLICATIONS

Chinese Office Action issued in application No. 201410650155X, dated Apr. 29, 2016 (30 pgs).

(Continued)

*Primary Examiner* — Robert B Davis
(74) *Attorney, Agent, or Firm* — Hayes Soloway P.C.

(57) ABSTRACT

Apparatus for shaping plastics material pre-forms into plastics material containers includes a conveying device which conveys the pre-forms along a pre-set path. The conveying device has a movable station carrier arranged at least indirectly on a stationary base carrier on which are arranged a plurality of shaping stations which have in each case blow moulding devices which have cavities, inside which the pre-forms are shaped. The apparatus has a changing device for removing the blow moulding devices from the blow mould carriers and/or for arranging blow moulding devices on the blow mould carriers. The changing device has a first control device for controlling a removing and/or an arranging movement of the blow moulding devices on the blow mould carriers, and a second control device for controlling a blow moulding procedure, wherein the first control device and the second control device preferably co-operate at least for a time.

19 Claims, 6 Drawing Sheets

(51) Int. Cl.
*B29C 33/30* (2006.01)
*B29C 49/36* (2006.01)
*B29C 49/78* (2006.01)
*B29C 49/06* (2006.01)
*B29L 31/00* (2006.01)

(52) U.S. Cl.
CPC ............. *B29C 2049/4856* (2013.01); *B29C 2049/4858* (2013.01); *B29C 2049/4892* (2013.01); *B29L 2031/712* (2013.01)

(58) Field of Classification Search
CPC ............. B29C 49/4273; B29C 49/48; B29C 2049/0094; B29C 2049/4858; B29C 2049/4856; B29C 2049/4892; B29C 2049/4694
See application file for complete search history.

(56) References Cited

U.S. PATENT DOCUMENTS

| | | | |
|---|---|---|---|
| 8,505,268 B2 | 8/2013 | Stoiber et al. | 53/55 |
| 8,770,957 B2 | 7/2014 | Laumer | 425/73 |
| 8,807,980 B2 | 8/2014 | Meinzinger et al. | 425/186 |
| 8,974,211 B2 | 3/2015 | Cirette et al. | 425/182 |
| 9,375,878 B2 | 6/2016 | Hahn et al. | 700/204 |
| 2006/0290034 A1 | 12/2006 | Sideris | 264/537 |
| 2010/0269555 A1 | 10/2010 | Theis et al. | 72/4 |
| 2011/0061690 A1 | 3/2011 | Seger | 134/137 |
| 2013/0040009 A1* | 2/2013 | Laumer | B29C 49/46 425/182 |
| 2014/0004219 A1 | 1/2014 | Cirette et al. | 425/188 |
| 2014/0305076 A1 | 10/2014 | Winzinger | B65B 59/04 |
| 2015/0151455 A1 | 6/2015 | Cirette et al. | B29C 31/006 |

FOREIGN PATENT DOCUMENTS

| | | | |
|---|---|---|---|
| CN | 103402735 | 11/2013 | B29C 31/00 |
| DE | 10 2009 040 978 | 3/2011 | B65G 1/12 |
| DE | 102009040977 | 3/2011 | B65B 57/00 |
| DE | 102010033171 | 2/2012 | B29C 49/42 |
| DE | 102011052574 | 2/2013 | B29C 49/42 |
| DE | 102011054890 | 5/2013 | B67C 7/00 |
| EP | 0411970 | 2/1991 | A61L 2/10 |
| EP | 0513951 | 11/1992 | B29C 45/17 |
| EP | 2292402 | 3/2011 | B29C 49/42 |
| FR | 2990639 | 11/2013 | B29C 49/42 |
| WO | WO2012120031 | 9/2012 | B29C 31/00 |
| WO | WO 2013/060549 | 5/2013 | B67C 3/22 |

OTHER PUBLICATIONS

European Search Report (no translation) issued in application No. 16157101.3, dated May 20, 2016 (9 pgs).
European Search Report issued in application No. 14194892.7, dated May 8, 2015 (7 pgs).
Extended European Search Report issued in application Mo. 14194986.7, dated May 8, 2015 (6 pgs).
German Search Report (no translation) issued in application No. 10 2013 113 076.3, dated Nov. 5, 2014 (6 pgs).
German Search Report (no translation) issued in application No. 10 2013 113 074.7, dated Nov. 17, 2014 (7 pgs).
German Search Report issued in corresponding German Patent Appln. No. 10 2013 113 077.1 dated Nov. 6, 2014 (7 pgs).
Chinese Office Action issued in application Mo. 2014106831511, dated May 4, 2016 (29 pgs).
Chinese Third Office Action issued in application No. 2014106501920, dated Dec. 14, 2016 (39 pgs).
Office Action issued in corresponding U.S. Appl. No. 14,541,309, dated Sep. 9, 2016 (38 pgs).
European Office Action (w/translation) issued in application No. 14 194 986.7, dated Jul. 14, 2017 (11 pgs).

* cited by examiner

Fig. 1
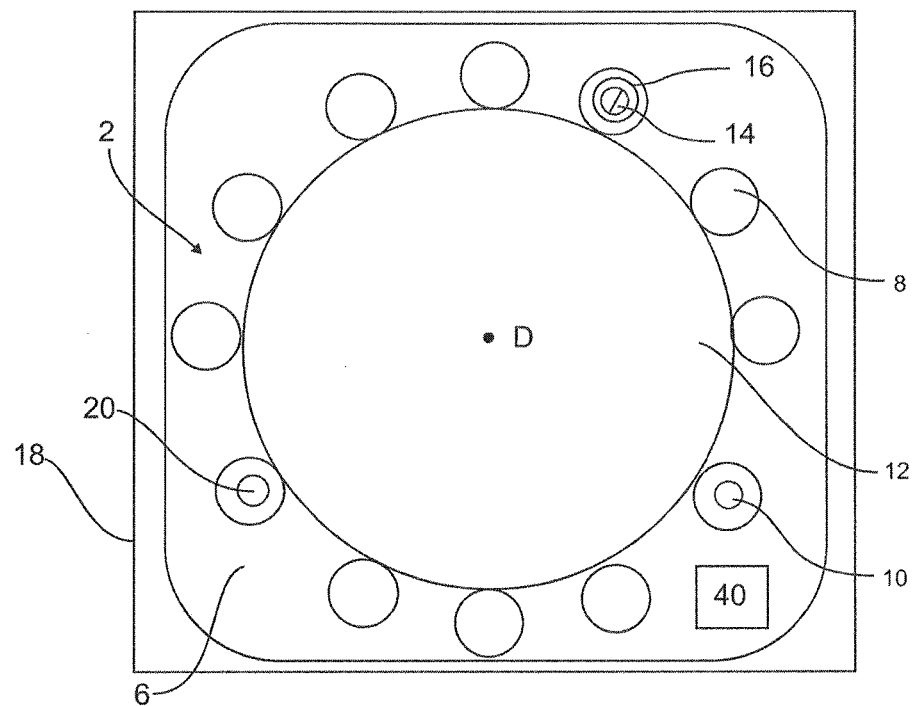
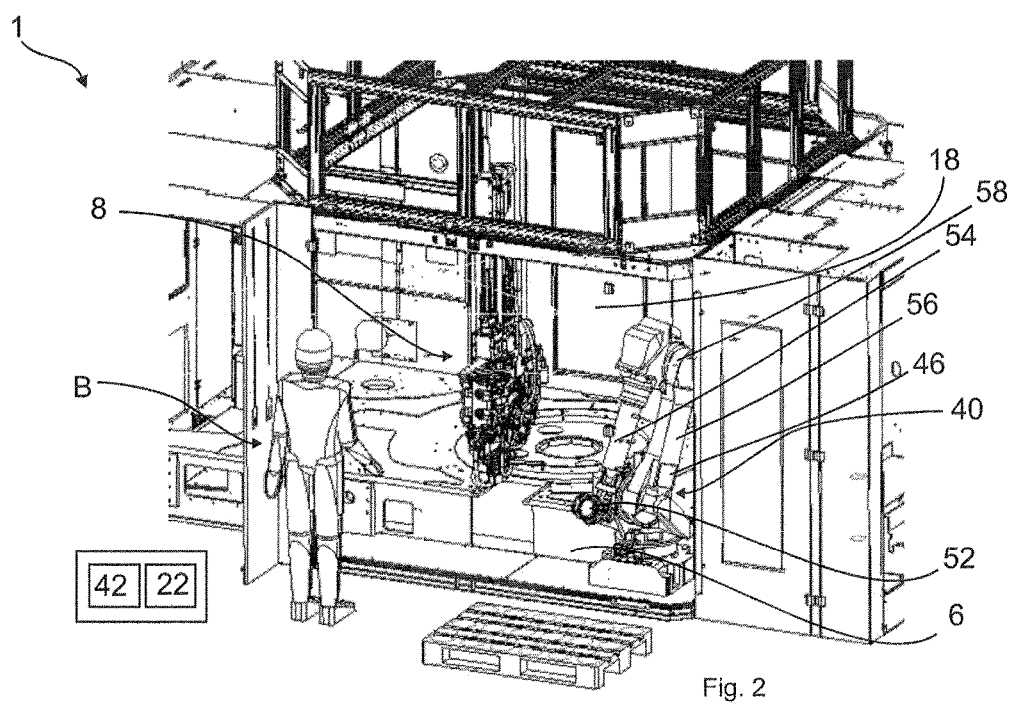
Fig. 2

BLOW MOULDING MACHINE WITH CHANGING ROBOT AND METHOD OF OPERATING IT

BACKGROUND OF THE INVENTION

The present invention relates to an apparatus for the shaping of plastics material pre-forms into plastics material containers. Apparatus of this type have long been known from the prior art. In this case heated plastics material pre-forms are usually shaped into plastics material containers such as plastic bottles by being acted upon with air pressure. For this purpose a plurality of shaping stations or blow moulding stations respectively are usually arranged on a rotatable carrier. In this case these blow moulding stations have in each case blow moulds which have a cavity inside which the plastics material pre-forms are shaped into the plastics material containers. These blow moulds thus have a negative of the container to be produced. If the apparatus is to be changed over to other containers, the individual blow moulds have to be exchanged. In the prior art these blow moulds are removed individually from the respective shaping stations. An operator removes the individual blow moulding devices in this case and replaces them with new blow moulding devices which are intended to mould the corresponding new containers. The changing procedure therefore lasts a relatively long time and an operator is also necessary.

The object of the present invention is therefore to simplify a conversion of blow moulding machines in this way. In particular, corresponding changing procedures should also be accelerated.

SUMMARY OF THE INVENTION

An apparatus according to the invention for the shaping of plastics material pre-forms into plastics material containers has a conveying device which conveys the plastics material pre-forms along a pre-set conveying path. In this case the conveying device has a movable station carrier which is arranged at least indirectly on a stationary base carrier and on which are arranged a plurality of shaping stations, these shaping stations having in each case blow moulding devices which form cavities in each case, inside which the plastics material pre-forms are capable of being shaped to form the plastics material containers. In this case these blow moulding devices are arranged in each case on blow mould carriers. It is preferable for these blow mould carriers to be a component part of the individual shaping stations and thus it is preferable for them likewise to be arranged directly on the station carrier.

According to the invention the apparatus has a changing device which is suitable and intended for removing at least the blow moulding devices from the blow mould carrier thereof and/or for arranging blow moulding devices on the blow mould carriers, the changing device having a first control device for controlling a removing movement of the blow moulding devices and/or an arranging movement for arranging the blow moulding device on the blow mould carriers and the apparatus also has a second control device for controlling a blow moulding procedure, the first control device and the second control device preferably co-operating at least for a time.

In other words it is preferable for these two control devices to be intended and suitable to co-operate, at least for a time, in particular during a changing mode, within which the blow mould parts can be exchanged. In this case it is preferably possible to fall back upon the control device for controlling the blow moulding procedure, for example for the purpose of the carrier, on which are arranged the shaping stations, being turned further after substituting a specified blow mould in each case, so that the following blow mould can also be substituted. It is also possible to fall back upon the control of the blow moulding procedure to the extent that for example an opening movement of the blow mould carriers can also be used for the removal of a blow mould.

In particular, these two control devices co-operate during a changing procedure of the blow moulds. In this way, during a changing procedure the same movements as are also necessary in working operation can also be used in the changing procedure, such as for example the conveying movement of the shaping stations, the opening and closing of the blow mould carriers and the like.

During the changing procedure the blow mould carriers can likewise be opened in order to be able to remove the blow moulding device. In this way for example, the second control device can effect an opening of the blow mould carriers and, in a manner dependent upon this, the first control device can effect a removal of the blow moulding devices. As a result of this, a fully automatic changing of the blow moulds also becomes possible. In this way, the control of the changing device preferably interacts with the control device of the shaping machine or blow moulding machine respectively.

It is preferable for the changing device to have at least one pivotable changing arm and it is preferably arranged at least indirectly on the base carrier. It is therefore proposed that a changing device, in particular in the form of a changing robot, should be arranged directly in the region of the apparatus for the shaping. It is advantageous therefore for this apparatus to have a base carrier, such as for example a machine stand, on which the station carrier is also arranged. The changing robot is also arranged in turn on this base carrier, so that it can be incorporated as a whole in the machine.

A substantially indirect arrangement is to be understood in this case as being that the changing device can be arranged directly on the base carrier, but it is also possible for the changing device to be arranged on a further element, for example an intermediate carrier which in turn is arranged on the base carrier.

In this way, an incorporation of the changing device or the robot respectively in the machine is proposed. It is advantageous for the blow moulding device to be formed in a multiplicity of parts to have at least two lateral parts and one base part. During operation these three parts form the aforesaid cavity for the expansion of the plastics material pre-forms. It is advantageous for at least two parts, and particularly preferred for all three parts, of this blow moulding device to be capable of being locked to one another, so that the blow mould can be removed as a whole out of the machine or from the blow mould carrier respectively. In this way, the blow mould carrier is suitable for receiving different blow moulding devices. In this case it would be possible for the blow moulding device itself to be arranged on the blow mould carrier by means of carrier shells.

It is advantageous for the blow mould carriers to be movable, and in particular pivotable, with respect to one another. In this case the blow mould carriers can be pivoted one out of the other by a pre-set pivoting angle in a working operation, in order to introduce plastics material pre-forms and/or in order to remove finished containers. In this case relatively large opening angles are preferably possible for the changing operation.

In the case of a further advantageous embodiment the shaping stations have in each case stretch rods which are capable of being inserted during operation into the plastics material pre-forms in order to stretch the latter in the longitudinal direction thereof. It is advantageous for the individual shaping devices also to have stressing devices which, in particular, have blow moulding nozzles which during operation act upon the plastics material pre-forms with a flowable, and in particular a gaseous, medium. It would be possible in this case for other parts of the shaping stations also to be changed, such as in particular the aforesaid stressing device or blow moulding nozzles respectively and/or the stretch rods.

It is advantageous for the station carrier to be a rotatable carrier, such as in particular a blow moulding wheel. The individual shaping stations are preferably arranged on an external periphery of this rotatable carrier. In this way, the shaping stations are moved along a circular path in working operation.

It is advantageous for the apparatus to have a drive device for moving the station carrier, and this drive device preferably permits in this case both a continuous movement of the station carrier and a clock-timed movement of the station carrier, which thus has rest phases between movements in each case. It is advantageous in this case for this type of movement to be capable of being set in a manner dependent upon an operating mode. In working operation the station carrier is preferably moved in a continuous manner and in an alternating operation preferably in a clock-timed manner. In this case a movement of this station carrier can also be co-ordinated with movements of the changing devices. It is advantageous for the station carrier to be a blow moulding wheel.

A fully automatic changing procedure, in particular by means of an industrial robot, is made possible by the procedure according to the invention. It is advantageous in this case for the blow moulding device to be locked fully automatically, in particular in changing operation, or for the individual elements of the blow moulding devices to be fastened to one another respectively. The changing device is thus preferably suitable for gripping or removing the complete blow moulding device, i.e. the at least three component parts thereof in the unit. It is advantageous for a suitable locking of the mould to be deactivated after the gripping of the blow moulding device. In a further step the changing device can deposit the form unit in a storage apparatus, such as a magazine. As a result, the changing device can insert a new mould unit or a new blow moulding device respectively into a blow mould carrier and (preferably) lock the new blow moulding device to the blow mould carrier.

After that, the station carrier can be moved further by one position in order to exchange a further blow moulding device. In this way, in particular, a fully automatic procedure can be carried out in which no user is necessary.

In the case of a further advantageous embodiment the apparatus has a housing and surrounds at least the station carrier in the peripheral direction thereof. In this case the complete blow moulding device and/or the changing device can be arranged inside a housing in principle, in which case this housing can also have a protective function.

The changing device is preferably incorporated directly into the machine and can be built up for example on a base frame. In the case of a further advantageous embodiment the changing device is capable of being displaced as a whole in a space surrounded by the housing. In this case it is possible for the changing device to be incorporated completely into the machine in an operating state and so not to be visible again for example from the outside and, in particular, not to affect the operation of the shaping device. It is possible in this case for a covering of the housing also to act as a protective device for the changing device or the robot respectively. In working operation it is thus preferable for the aforesaid changing device to be arranged inside the housing.

In the case of a further preferred embodiment the changing device has a first control device for controlling a removal movement of the blow moulding devices and/or the arranging movement for the arrangement of the blow moulding device on the blow mould carriers, and the apparatus also has a second control device for controlling a blow moulding procedure, one control device being incorporated in the other control device.

In particular in this case, the control means of the changing device is incorporated in a control means of the apparatus or blow moulding machine respectively. In this way, it would be possible for the changing device to be designed in the form of a module which can also be incorporated in the blow moulding machine in terms of control, for example after plugging together or connecting in terms of control. In this way, it would also be possible for a changing device to be retrofitted on already existing apparatus. These control devices can be designed in this case in such a way that a protection region is enlarged during a changing operation. In a working operation the changing device can be present in a position of rest in which no risks arise from it and in which it also does not obstruct operation of the machine.

In the changing operation the changing device also becomes active, so that it is necessary to enlarge those regions which could be dangerous for the user to enter in some cases. In this way, it is possible for protection regions altered in the course of the changing operation also to be blocked or at least made recognizable to the user.

In this case it would be possible for addition protection elements to be actuated in the course of the changing operation, as a result of which the safety of the user can be increased.

In the case of a further advantageous embodiment the changing device has at least one gripping device for gripping the blow moulding devices. This can be a gripping device which grips the blow moulding device in its entirety. In this case it would be possible for media required on the gripping device and/or electrical signals to be conveyed through regions of the changing devices, such as for example axles or pivot arms. In addition, it would also be possible for connections of this type to be conveyed by way of rotary feed-throughs, for example on the axles of the changing devices.

In the case of a further advantageous embodiment the changing device has at least one detection device for detecting at least one force acting upon an element of the changing device. In this way, in particular, external forces can act, which act for example upon a change arm which removes the blow moulding devices. In this way, in particular, the control device mentioned above can be designed in such a way that it can react to external forces, for example, during defined operations such as depositing or taking up a blow moulding device, the changing device can differ from a nominal position (soft-float). In general, a detection device is involved which can react to physical actions or can detect actions of this type, such as for example a torque, forces, pulses or the like. In this way, a rapid reaction of the changing device is possible.

It is preferable, however, for the changing device to move within a limited operating area. This means that, in particular, the removal and supply movement for the blow moulding devices takes place in a limited operating area. In reaction to the external forces mentioned above a position can deviate from this operating area. Otherwise, however, it is preferable for this defined operating area to be maintained, in particular during a change of the mould.

In this case it is advantageously possible for the operating area of the changing device to be limited with respect to safety and, in particular, mechanically. A limitation in this way would be possible by various steps, for example by light barriers which detect a faulty or an excessive movement of the changing device and, as a result, cause either a return or an emergency stop of the changing device. In addition, it would also be possible, however, to limit the operating area by mechanical elements, such as for example stops.

In addition, it is also preferably possible for an operating area of the changing device to be checked with a view to safety and electrically or even with respect to control respectively. In this case it is possible, in particular, for this operating area to be (further) limited in a manner deviating from a maximum possible operating area.

In the case of a further advantageous embodiment the changing device has a serial and/or parallel kinematic arrangement with at least three axes of movement. It is advantageous for the changing device to have a serial and/or parallel kinematic arrangement with more than three axes of movement. In this way, a very high degree of freedom of movement of the changing device or a gripping element of the changing device respectively is made possible. The blow moulding devices can therefore also be removed from their blow mould carriers or supplied to them respectively in different ways in a manner dependent upon the actual circumstances.

In this case it is possible for the apparatus to have an operating device in order to control the changing device or the gripper arm respectively. This can be for example a manual operating unit. It would also be possible, however, for a control means of the changing device to be capable of being controlled by way of appliances such as for example smartphones.

In this case a control by an operating unit of this type is advantageous, in particular, during set-up operation, i.e. during the supply of new blow moulding devices.

The present invention further relates to a method of operating a shaping device for the shaping of plastics material pre-forms into plastics material containers. In this case, during working operation of the apparatus, the plastics material pre-forms are conveyed along a pre-set conveying path by means of a plurality of shaping stations and are expanded by being acted upon with a flowable, and in particular gaseous, medium to form the plastics material containers. In addition, in order to expand the plastics material pre-forms, use is made of blow moulding devices, in the interior of which the plastics material pre-forms are expanded to form the plastics material containers. In this case in a changing operation at least one of the blow moulding devices is removed from the apparatus and/or one of the blow moulding devices is arranged on a blow mould carrier of the apparatus.

According to the invention a first control device controls a removal movement of the blow moulding devices and/or an arranging movement for the arrangement of the blow moulding device on the blow mould carriers, and this first control device advantageously co-operates at least for a time with a second control device for controlling a blow moulding procedure. It is therefore also proposed in terms of the method that the changing procedure should be controlled by a control device and that the latter should also interact, in particular, with a control device which controls the blow moulding procedure or individual movements of this blow moulding procedure respectively. As a result, it is also possible for those movements which occur during a working operation or a blow moulding procedure respectively to be used for the changing procedure.

In order to change the blow moulding devices it is advantageous for a changing device arranged on the apparatus to be used. In the case of this arrangement it is also proposed with respect to the method that changes of the blow moulds in this way should be carried out by means of changing robot arranged on the apparatus or incorporated therein respectively.

In the case of a further preferred method the shaping stations are conveyed in working operation along a circulating conveying path and in the changing operation the blow moulding devices are removed in a pre-set fixed position of the respective shaping station, the blow moulding device of which is to be removed, with respect to the circulating conveying path. It is therefore proposed that the shaping stations should circulate in working operation, as is known per se in the prior art. For the individual changing procedure, however, it is proposed for it to be carried out at least one precisely defined station which is also, in particular, situated in an area of action of the changing device. In other words it is advantageous for the removal position on a blow moulding wheel always to be identical. In this case it is possible for the changing device to be orientated during the production or the working operation in such a way that it can be arranged inside a protective area or housing respectively of a blow moulding machine.

With respect to the control device it is possible for the latter to control the movement sequence of the changing device or the robot respectively by way of two independent systems of co-ordinates. It is preferable in this case for a system of co-ordinates to be positioned on the removal or insertion position of the blow moulding device with respect to the shaping station or the blow mould carriers respectively. A further system of co-ordinates can be present in the region of a receiving device or a magazine respectively, in which the blow moulding devices are set down.

It is also possible, however, for the positions of the receiving settings of the blow moulding devices on the receiving device or the magazine respectively to remain unchanged relative to the system of co-ordinates thereof independently of the receiving device and/or for the positions of the receiving settings to be present at equidistant distances from this system of co-ordinates. In this case it is possible for a display device, such as in particular an input screen of the changing device to be provided. Specific values of the systems of co-ordinates, in particular the X, Y and Z values of the systems of co-ordinates, can be changed by way of the aforesaid input screen. In addition, a further input device, such as an input screen, which preferably interacts with an input device of the blow moulding machine, can preferably be arranged on the changing device.

There are numerous possibilities for the removal and supply of the blow moulding devices.

In this way, it would be possible for all the blow moulding devices first to be removed from the individual mould carriers, i.e. the individual shaping stations, and to be introduced into an empty magazine or storage system respectively. After that, this storage system with the old moulds is replaced by a complete storage system with the new blow moulding devices to be exchanged. After that, all the new moulds are introduced into the blow mould carriers.

The storage systems can be changed in this case for example by means of lifting carriages or by means of turntables, for example in the manner of pallet changing in the case of machine tools. In this case the blow mould carrier will advantageously carry out two complete revolutions for a complete change.

In the case of a further possible changing procedure a magazine contains an empty setting. In this case a new mould is first moved from a moulding position into this empty setting. After that, an old mould is moved from the mould carrier into the aforesaid moulding position. In a further step a new mould is transferred out of the magazine into the mould carrier. After that, a second new mould is moved into the empty setting and so forth, until the entire changing is completed. The temporary storage in an empty setting ensures that a specified blow moulding device is transferred again to a specified storage position or a specified blow mould carrier respectively. It is advantageous in this case for the aforesaid empty setting to be situated spatially between the blow mould carrier and the storage system and preferably on or in the storage system.

It is advantageous for the removal of the blow moulding device and/or the supply of new blow moulding devices to be carried out in a clock-timed operation. This means that the individual changing of the blow moulding device takes place while the shaping station is at a standstill. In this case the changing device can deposit a specified blow moulding device in a magazine, and during this the shaping device itself can move further by one station, i.e. the blow moulding wheel rotates further by one position. In order to introduce and remove the blow moulding devices it is advantageous for a radial direction with respect to the conveying path to be used. As mentioned above, it is also possible to park or set down the blow moulding device in an intermediate station. Therefor a vertical movement can preferable be used.

With respect to the method it is possible for the gripping device of the changing device to grip the blow moulding device in a positively locking manner, in order to convey these [to] or remove them out of the apparatus. It is advantageous for the gripping device of the changing device to engage in the blow moulding device in a non-positively locking manner.

In the case of a further advantageous embodiment the removal and/or the deposition of the blow moulding device is carried out in a manner controlled with respect to the path and/or the force and preferably in a manner controlled with respect to both the path and the force.

In the course of the control it is possible for the control device to travel to at least one defined reference point on the shaping station or the receiving carriers respectively or the blow mould carriers and/or preferably also at least one defined reference point at a deposition point, for example a magazine. In this way, the aforesaid points can be transmitted into the control means of the changing device, as a result of which the exact positions of the mould receiving means or the blow mould carrier respectively and also of the magazine or the storage device respectively can be determined. It is preferable in this case for the aforesaid reference points to be traveled to after each exchange of a magazine device or to be traveled to in the event of breakdowns, such as for example voltage failures, in order to be transmitted to the control means in this way.

In this case it is possible for the reference points determined in this way to be saved and/or compared with reference points which have been saved in the control means or a storage device of the control means respectively. If a deviation which, in particular, goes beyond a pre-determined amount is present between the determined reference point and the reference point already saved, then an error report or a notification respectively can be produced.

In the case of a further advantageous embodiment the changing device has an image-recording device, such as for example a camera or the like. With the aid of this camera device it is possible to detect the precise recording or deposition points for the blow moulding devices.

In this context it is possible for the blow moulding devices and/or the blow mould carrier and/or the magazine device to contain in each case a marking in order to ensure an association between the blow moulding devices and the respective blow moulding station. In this way, it is possible to ensure that a specific blow moulding device which has been removed from a specific shaping station is also associated with the same shaping station again in a further change. In this way, it would be possible for an individual identification to be associated with each receiving magazine.

In this case these markings can be for example barcodes, QR codes, RFID tags and the like. Advantageously it is possible that this marking can be scanned without contact. It is advantageous for the marking or a value characteristic of this marking respectively to be taken up into the control device of the machine.

In the case of a further method it is also possible for the respective markings to be read in afresh after each change of the magazine device or even in the event of breakdown of the machine. In this way, it is possible to ensure a secure association even under exceptional conditions.

A further receiving device or a magazine respectively for the blow moulding devices is described below. In order to change the mould, this receiving device can be arranged at a suitable position, for example adjacent to the shaping device. In this case the magazine or receiving device respectively can have entry regions by way of which the blow moulding devices can be deposited in the magazine or the receiving devices respectively. These entry regions can be made conical in this case in order to allow a secure entry of the blow moulding devices. It is advantageous in this case for the blow moulding device or the packet of moulds respectively to be introduced substantially vertically into the magazine. It is particularly preferred for the blow moulding device to be capable of being deposited in cylindrical openings in the magazine or the receiving device respectively. The magazine itself can be arranged—in particular in a positively locking manner—in this receiving device.

In the case of a preferred embodiment this magazine apparatus can have in this case resilient elements, in particular in the region of the cylindrical openings, for the introduction of the blow moulding devices, in order to be able to compensate tolerances.

In the case of a further advantageous embodiment it would also be possible for the magazine device or the receiving device respectively and/or the blow moulding device to be provided with entry regions, and in particular with tapered entry regions, in the regions in which the blow moulding device comes into contact with the cylindrical openings of the magazine apparatus.

In the case of a further advantageous embodiment the magazine device or receiving device respectively has, as mentioned above, a plurality of openings for receiving the individual blow moulding devices. In this case these openings are preferably made cylindrical. It is particularly preferred for these openings in the magazine apparatus to be produced from plastics material at least locally.

In this case it is possible for these openings to be arranged in a plurality of rows and, for example, for two adjacent rows to be offset from each other. In this way, the packing density of the blow moulding devices can be increased.

In the case of a further advantageous embodiment the position of the blow moulding device inside the receiving device is lower than the position of the blow moulding device in the blow mould carrier. In this way, during the dismantling of the blow moulding device it is lowered downwards.

In the case of a further advantageous embodiment the magazine has a polygonal, and preferably rectangular, external contour, it being preferable for the longitudinal side of this external contour to be arranged substantially at a right angle to a notional radial connecting line between a midpoint of the reference circle and the blow mould carriers. In this way, the magazine device can be reached very easily from the changing device or an arm of the changing device respectively.

The design of the blow moulding device is described below. In this way, it is possible, in order to unlock the blow moulding devices on a mould carrier or even a mould carrier shell or even during the unlocking of a base part of the blow moulding device, for the arrangement, i.e. in particular the lateral parts and the base part, to be connected together mechanically. A magnetic connection would also, however, be possible.

It is advantageous for a fixing mechanism of this type, which connects the individual blow mould parts to one another, to be designed in such a way that it has or exerts respectively only a force in a tensile direction and has a specified yielding radially thereto, in order to compensate tolerances. It is advantageous for a projection, a cam or the like, behind which an element of the gripping device can engage or into which the gripping device can move, to be provided on the parts of the blow moulding device, such as for example the blow mould halves.

In the case of a further advantageous embodiment the projections or cams connected to a gripping device are advantageously arranged radially inside the reference circle described by a mid-point of the container. In this way, it is possible to ensure that these cams cannot come into contact with clamps, for example of an infeed and discharge star wheel, even in working operation.

In the case of a further advantageous embodiment it would also be possible for the two mould shells and a base mould of the blow moulding device to have provided between them a connection in a positively locking manner, which prevents rotation of the base mould relative to the lateral parts or the mould shells respectively. In addition, it would also be possible for the base mould to be connected mechanically to the mould halves before the changing procedure.

In order to simplify a loading and unloading procedure it would be possible for an axis of rotation of the blow moulding device to extend substantially parallel to the axis of the mould carrier or even towards an axis of rotation of the blow moulding wheel respectively during the loading and unloading (of the plastics material containers).

In a further advantageous embodiment it would also be possible for a protection area of the blow moulding machine to be separated automatically from a deposition area of the blow moulds or the blow moulding devices respectively during production. A separation of this type can be automatically carried out—in particular automatically—in this case at the beginning or start respectively of a mould-changing procedure.

In this case the protection areas can be altered in such a way that a machine operator can enter a region of the mould plant during the production of the apparatus or during the working operation respectively. In this way, it would be possible for an electromechanical unit for example to ensure the position of a shaping station relative to the changing device in each case after the positioning of the blow moulding wheel preferably in a positively and/or non-positively locking manner.

Furthermore, it would also be possible for the robot of the blow moulding device or the packet of moulds respectively to be deposited into the magazine from an intermediate position, while the blow moulding wheel travels a clock-timed step further or brings a following shaping station into a changing position respectively. In addition, the sequence of a change of the blow moulding devices could retain the travel of an intermediate station at which the blow moulding device is temporarily parked or deposited respectively. In this case the holding device need not be designed in the form of a double gripper and nevertheless an association of the moulds appropriate to the stations is possible in a storage device such as a magazine.

As already mentioned above, it may be advantageous for the opening movements of the blow mould carrier and of the base in a changing position for the blow moulding device to deviate from that in operation. This can be advantageous for example in the case of a mould carrier actuation means which is not coupled. It would also be possible for a blow mould carrier of the adjacent station leading or trailing respectively in each case relative to that in the changing position of the blow moulding device likewise to be pivoted away locally, in order to allow a larger opening angle for the shaping station present in the changing position.

Furthermore, it would be possible for a fixing mechanism for the mould shells and the base moulds to have a progressive characteristic line during a clamping sequence. A large stroke with a small force can take place at the beginning of a clamping sequence of this type, in order to be able to bridge distances as great as possible during the retraction. At the end of the clamping sequence a substantial force is preferably exerted only with a small stroke.

In the case of a further advantageous method the changing position of the blow moulding station and/or the magazine and/or an intermediate position for example in which the blow moulding devices are positioned in the meantime, is or are present in a pre-set peripheral range of an effective circle of the changing device, preferably in a range of 270° of the effective circle, preferably in a range of 220° of the effective circle and, in a particularly preferred manner, in a range of 180° of the effective circle.

In the case of a further advantageous method, during the removal and/or arrangement of the blow moulding device from the stations or to the blow mould carriers respectively, the changing device or the changing robot respectively performs a radial movement relative to the reference divided circle of the apparatus. This can be a purely radial movement but it would also be possible for a movement with a radial component to be involved.

In the case of a further advantageous method, during the removal and/or arrangement of the blow moulding device from the stations or to the blow mould carriers respectively, the changing device or the changing robot respectively performs a substantially vertical movement. The word "substantially" is taken to mean in this case that the direction of movement deviates from the exactly vertical direction by not more than 20°, preferably by not more than 10° and in a particularly preferred manner by not more than 5°.

BRIEF DESCRIPTION OF THE DRAWINGS

Further advantages and embodiments are evident from the accompanying drawings. In the drawings FIG. 1 is a diagrammatic illustration of an apparatus according to the invention;

FIG. 2 is an illustration of the apparatus with the changing device illustrated;

DETAILED DESCRIPTION OF THE DRAWINGS

Figure 3:
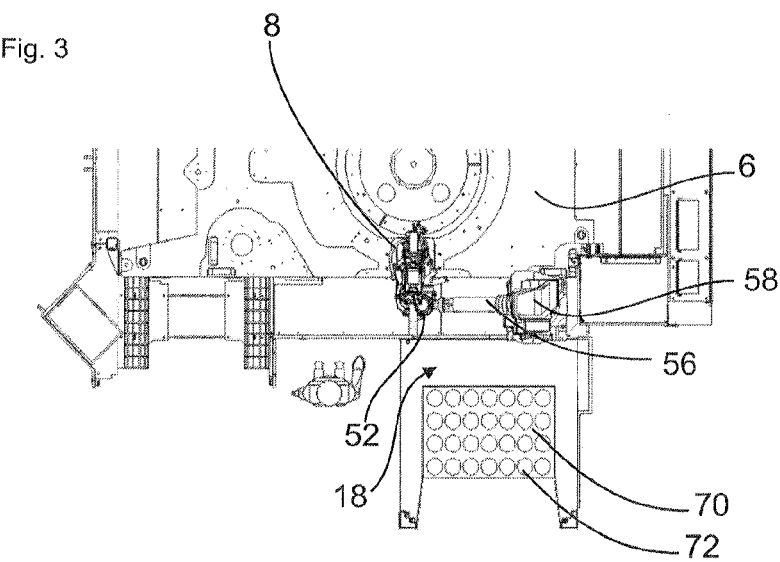
FIG. 3 is a plan view of the apparatus shown in FIG. 2.

FIG. 1 is a diagrammatic illustration of an apparatus 1 for the shaping of plastics material pre-forms into plastics material containers. In this case the plastics material pre-forms 10 are supplied to the individual shaping stations 8 and are expanded to form plastics material containers 20. After this expansion the plastics material containers are removed from the apparatus again. For this purpose a supply star wheel can be provided which supplies the plastics material pre-forms to the apparatus 1, as well as to a removal device, in particular likewise a conveying star wheel, which removes the finished containers from the apparatus. The apparatus 1 has a station carrier 12 on which a plurality of shaping stations 8 are arranged. In this case this station carrier 12 can be for example, as shown in FIG. 1, a blow moulding wheel, which is rotatable with respect to an axis of rotation D (which extends here at a right angle to the plane of the figure and thus vertically). Each individual shaping station has in this case one blow moulding device 14 in each case. This blow moulding device 14 is formed from two lateral parts and a base part. According to the invention these blow moulding devices can be interchanged. The blow moulding devices 14 are arranged on the blow mould carriers 16 in this case and can be removed from them or arranged on them respectively.

The reference number 40 designates a changing device which is used to remove the blow moulding devices from the blow mould carriers thereof or to arrange the blow moulding devices on the blow mould carriers. The reference number 6 designates a base carrier on which the station carrier 12 is mounted in a rotatable manner. The changing device 40 is also arranged on or adjacent to the base carrier 6. In this way, the changing device 40 can be incorporated in the apparatus. The reference number 18 designates a housing which surrounds the station carrier 12 at least in part but which can preferably, as shown below, also enclose or surround respectively the changing device 40.

The reference letter W designates a changing position. As mentioned above, the blow moulding devices are preferably changed at a specified changing position. This means that the shaping stations can be moved in succession into this changing position W by a rotation of the carrier 12 and that the old blow moulding devices can then be removed from this changing position and new blow moulding devices can preferably also be supplied. The reference letter R designates a radial direction. The changing device or a gripping device of the changing device respectively is preferably supplied in this radial direction to the shaping stations or the blow moulding devices respectively in order to change them.

FIG. 2 is a perspective illustration of an apparatus 1, in which case only one shaping device or shaping station 8 respectively is illustrated. The station carrier on which the latter is arranged is likewise not illustrated here. In addition, however, the base carrier 6 is again evident, on which the changing device 40 is arranged. This changing device 40 has in this case a first pivotable arm 56 as well as a second pivotable arm 54. These two arms are connected to each other in a pivotable manner by way of an articulation and drive connection.

The reference number 52 designates a gripping device which is used to grip and to convey the blow moulding devices. This gripping device in turn is arranged in this case on the second arm 54 in a pivotable manner and preferably also in a rotatable manner. In this way, the gripping device as a whole is pivotable about at least three, and preferably about at least four, axes in space. In addition, it would also be possible, as indicated by the rectangle shown in broken lines, for a plurality of changing devices to be provided, these being arranged, in particular, at least indirectly on the base carrier 6 in each case. In this way, the individual blow moulding devices could be exchanged more rapidly in a changing operation.

The reference number 46 designates in a diagrammatic manner a detection device which detects forces acting upon the changing device 40 or the gripping device 52 respectively, in order to be able to switch them off in this way in the event of an emergency. It is advantageous for the apparatus to have a plurality of detection devices of this type, it being preferable for the detection device to be associated with each individual drive device, which causes a movement of the changing device 40 or the gripping device 52 respectively. These detection devices can be for example force measurement devices which determine actual forces, torques and the like. It would also be possible, however, for the forces to be determined from parameters of the respective drive, for example from currents or the like.

The reference letter B designates a user who operates the plant. During an operation of the changing device he or she can advantageously not move in regions which conversely can be reached by the changing device 40.

The reference number 22 designates a control device for controlling the changing device. The reference number 42 designates a control device for controlling the shaping device itself. In this case these two control devices can interact with each other, in particular for a changing operation for exchanging the blow moulding devices. It is possible in this case for the changing device 40 to move in a normal working operation of the apparatus into a rest position in which the changing device occupies as little space as possible.

FIG. 3 is a plan view of the apparatus shown in FIG. 2. It is evident here that the changing device 40 is likewise incorporated in the housing 18. In the state shown in FIG. 3 the arm 56 is just swung out, so that the gripping device 52 can just grip one blow moulding device.

In addition, a magazine device 70 is also illustrated, which has a plurality of receiving points 72 for receiving the blow moulding devices. In this case these blow moulding devices can be inserted into the receiving points or holes 72 respectively in each case.

Figure 4:
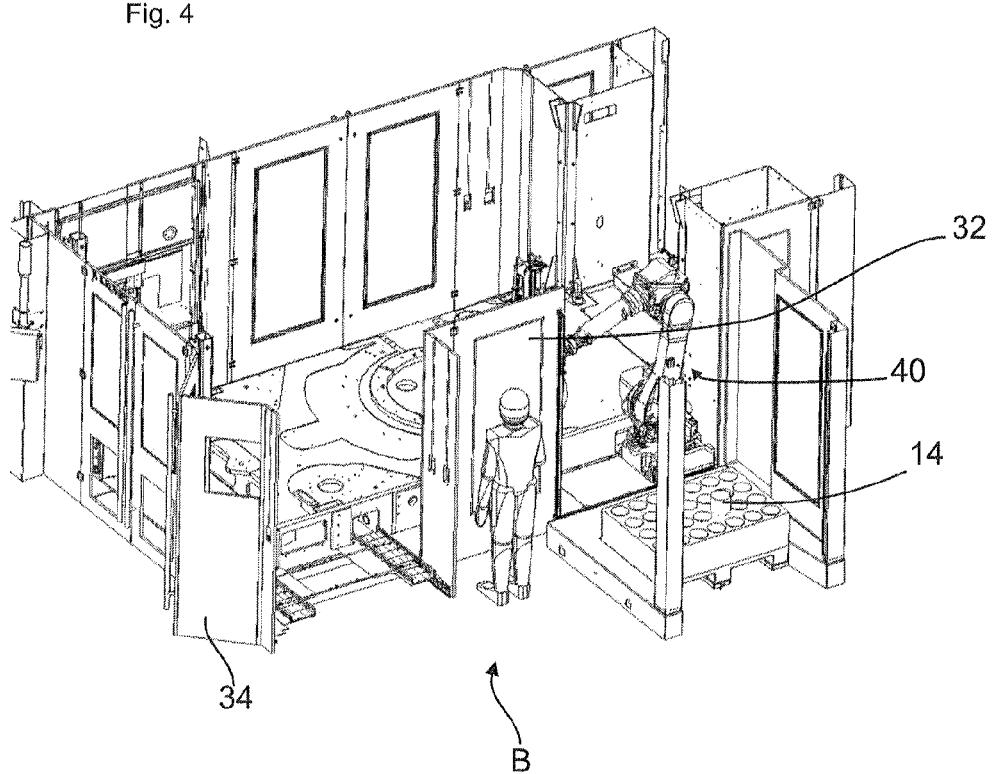
FIG. 4 is a further illustration of the apparatus shown in FIG. 2.

FIG. 4 is a further illustration of the apparatus according to the invention. It is evident that a wall 32 is provided in this case which separates the user B from the changing device 40, so that he or she cannot be injured. In addition, further movable wall parts 34 can also be provided, so that on the one hand the machine is more easily accessible for maintenance purposes, or on the other hand further changing devices can also be provided, as also illustrated in FIG. 1.

Figure 5:
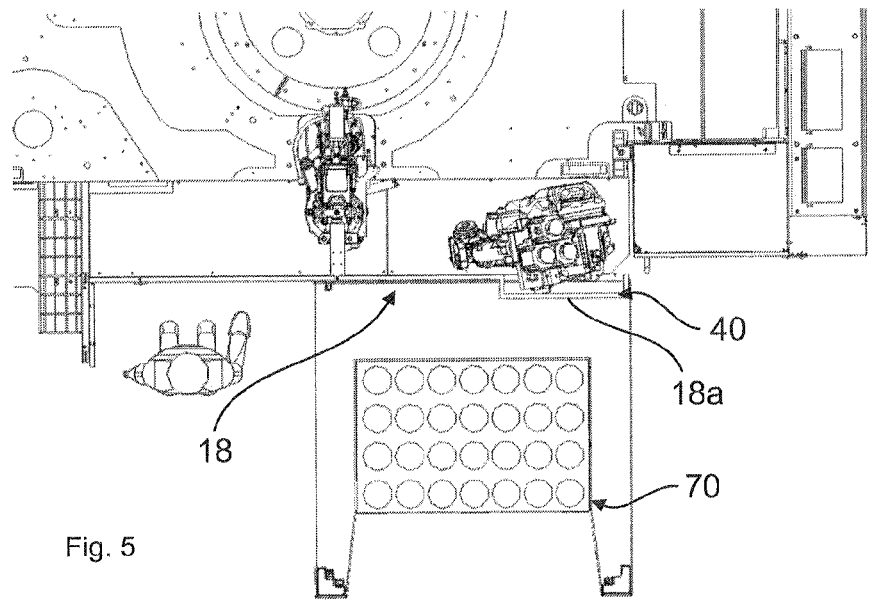
FIG. 5 is a further illustration of the apparatus shown in FIG. 2 in a further operating position.

The illustration reproduced in FIG. 5 is similar to the illustration reproduced in FIG. 3, in which case, however, the changing device 40 is in a different operating position. This can be for example a working operation in which the apparatus shapes plastics material pre-forms into plastics material containers. It is evident that a recess 18a, which can also be used for the complete removal of the changing device 40, can be arranged in the housing 18. In the state shown in FIG. 5 the individual arms of the changing device 40 can be folded in such a way that the changing device 40 occupies only a small space.

Figure 6:
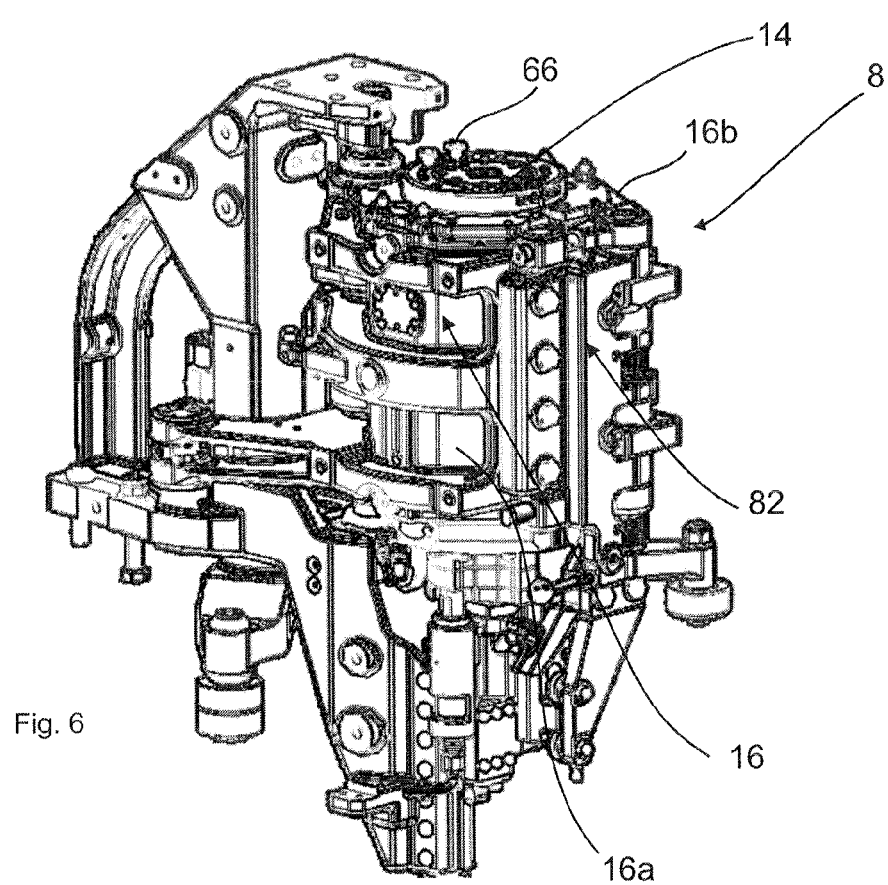
FIG. 6 is an illustration of a shaping station.

FIG. 6 is an illustration of a shaping station 8. In this case the blow mould carrier 16 is evident, which can have two blow mould carrier parts 16a, 16b which can be pivoted one out of the other in order to open and to close the blow moulding device 14. The two blow mould carrier parts 16a, 16b can also be pivoted one out of the other for the changing operation in order to be able to remove the blow moulding device 14.

The reference number 82 designates as a whole a locking device which locks the two blow mould carrier parts 16a and 16b to each other in working operation, so that even in the event of high pressures they do not pivot one out of the other. The reference number 66 refers to a projection which is arranged on the two lateral parts of the blow moulding device 14 in each case. This projection 66 is made sufficiently stable in this case for the blow moulding device 14 as a whole to be carried on this projection 66. In this case the gripping device or a component part of the gripping device respectively can engage behind this projection 66 so that the gripping device 52 can carry the blow moulding device by way of this projection. The blow moulding device can also be held together as a whole by the respective lateral parts of the blow moulding device being held on the projections 66.

Figure 7:
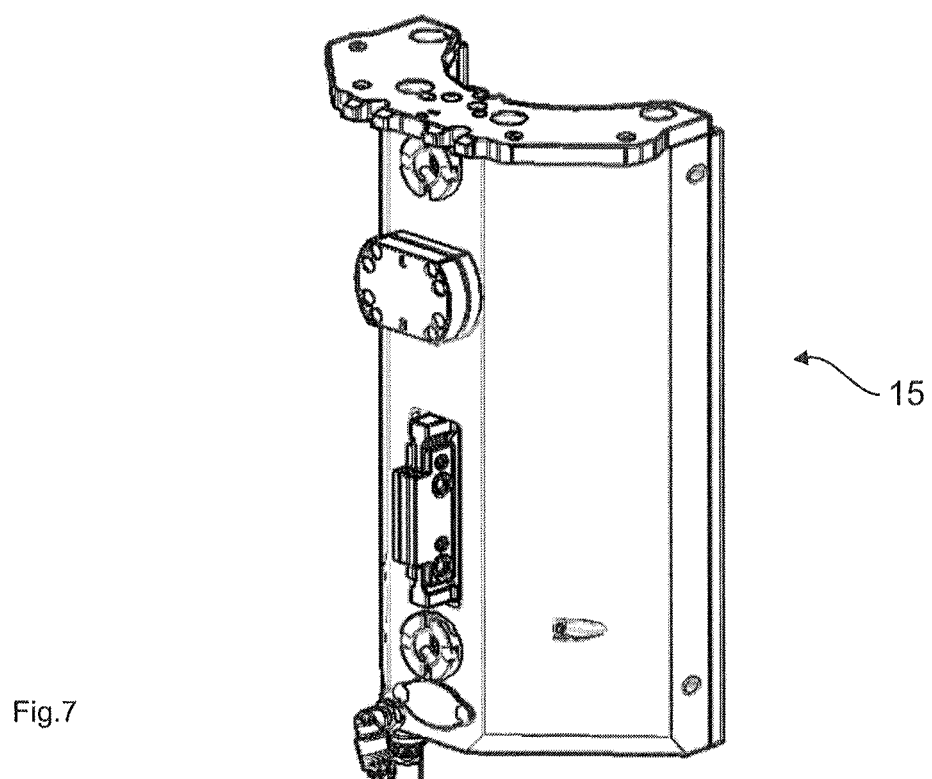
FIG. 7 is an illustration of a mould shell for a blow moulding device.

FIG. 7 indicates a blow mould carrier shell. This blow mould carrier shell 15 can be arranged on the blow mould carrier 16 and in turn can itself receive the blow moulding device or parts of the blow moulding device respectively. In this case supply and removal elements 15a can be provided in order to supply media, such as for example tempering media, to the blow mould shell 15.

Figure 8:
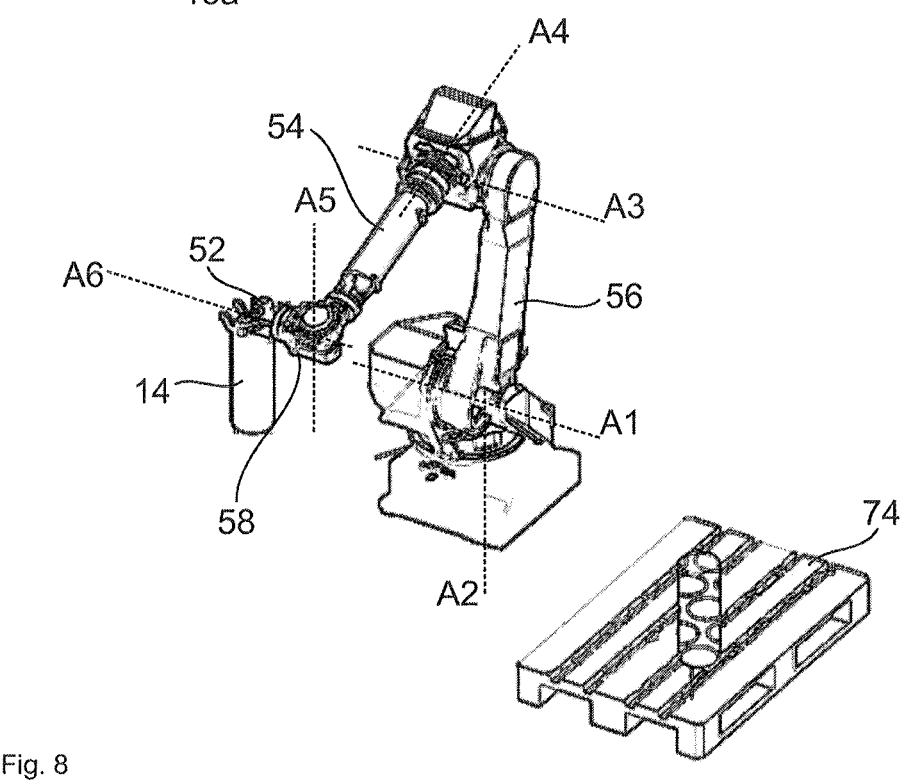
FIG. 8 is an illustration of a changing device.

FIG. 8 is a further illustration of the changing device 40. In this case the first arm 56 is in turn illustrated, which is pivotable with respect to a first axis A1. In addition, however, this arm 56 is also pivotable with respect to a second axis A2. A second arm 54 is arranged on this first arm 56 and in this case the arm 54 is pivotable with respect to an axis A3 relative to the first arm 56. In this case the two axes A1 and A3 are parallel to each other. These axes can also, however, be arranged obliquely or askew respectively with respect to each other. In addition, the second arm 54 is also rotatable with respect to a fourth axis A4.

Drive devices, such as in particular but not exclusively electric motor drives, are provided in each case in order to achieve this respective pivoting or rotational movement with respect to the individual axes and also with respect to the further axes still to be described. In addition, it would also be possible, however, for pneumatic and/or hydraulic drives to be used. A gripping device 52, which is used for gripping the blow moulding device, is provided on the second arm 54. This gripping element is pivotable in this case with respect to an axis A5 relative to the arm 54. This axis A5 can be at a right angle to the axis A3 and/or also at a right angle to the axis A4 in this case. In addition, the gripping device is arranged on the arm 54 by way of a carrier 58. The gripping device itself can in turn be rotatable relative to this carrier 58 with respect to an axis A6.

The blow moulding devices 14 can be removed from the individual shaping station by means of this plurality of movements and can be placed on a carrier 74 which in this case is illustrated as a Euro pallet. It would also be possible, however, for the blow moulding devices 14 to be introduced directly into openings in a magazine which are provided.

A distance between the magazine device or the pallet 74 and the changing device 40 in this case can be between 1 meter and 2 meters. In addition, a corresponding radius of action of the changing device can be in a range of 1.5 meters.

Figure 9:
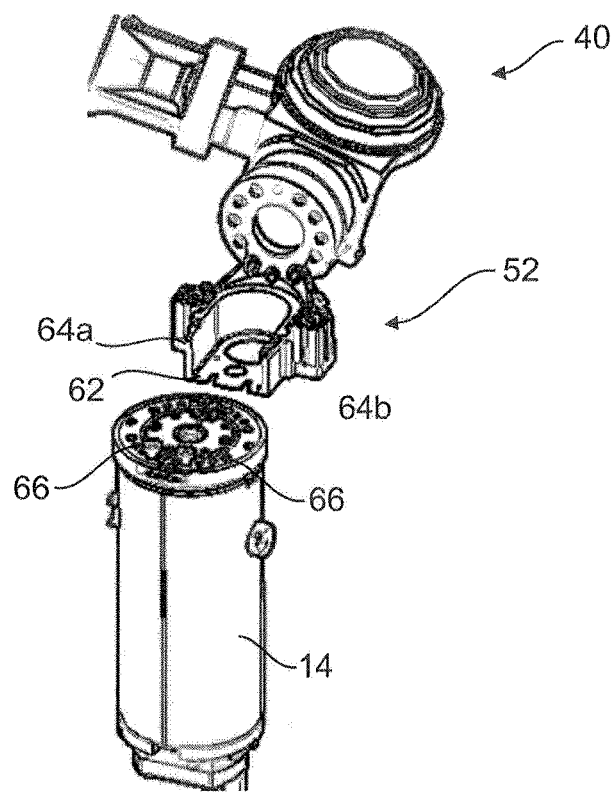
FIG. 9 is an illustration of a gripping device for gripping a blow moulding device.

FIG. 9 is a detailed illustration of the changing device 40 or the gripping device 52 thereof respectively. This gripping device can have in this case a guide element 62 which can be guided over a corresponding surface of the blow moulding device. In addition, projections 64a, 64b can also be provided, which are used for centring the changing device 40, or more precisely the gripping device, with respect to the shaping station. The reference number 63 refers to a recess which is situated in the guide element 62 and behind which the projections can engage in order to change the blow moulding device. In this way, the guide element 62 also serves to carry the blow moulding device 14.

Figure 10:
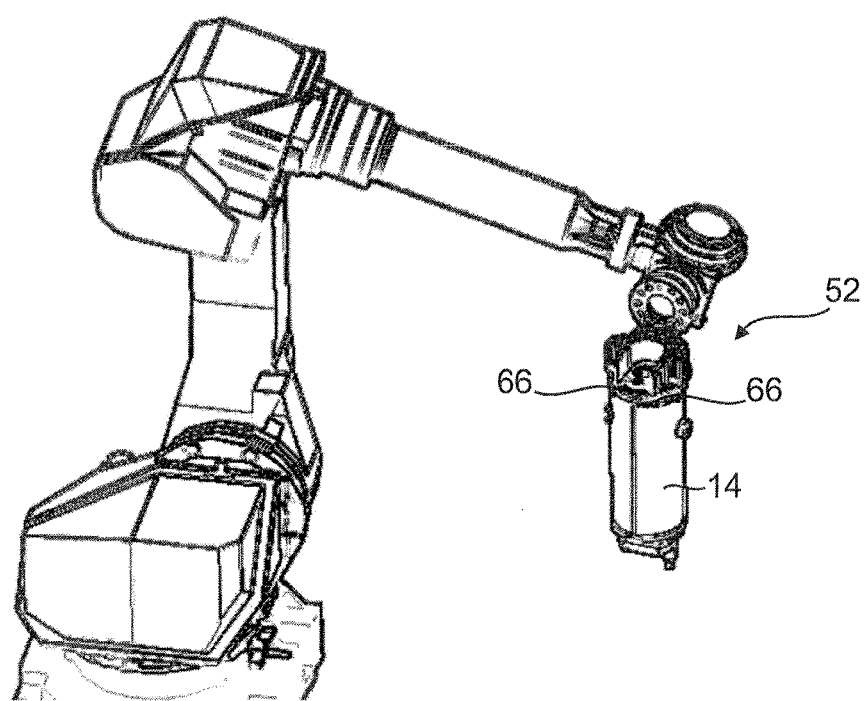
FIG. 10 is an illustration of a changing device with a blow moulding device.

FIG. 10 is an illustration of the changing device with a blow moulding device 14 arranged on it. It is evident that the gripper arm 52 engages in this case in two projections 66 which are arranged on the blow moulding device 14 and compresses them, so that, in this manner, the blow moulding device is held together. In this way, the projections 66, which are also shown in FIG. 9 and FIG. 6 and which are arranged on the blow moulding device 14, are thus used for holding the latter together during the conveying thereof. In this way, the gripping device 52 advantageously engages in elements of the blow moulding device 14 above the latter in order to hold it. This manner of gripping in the blow moulding device is suitable in a particular way, since the blow moulding device, as also shown in FIG. 6, projects beyond its carrier and, in this manner, can also be gripped in a closed state of the blow mould carrier 16. In this way it is possible for the changing device or the robot respectively first to engage in the blow moulding device 14 by way of the projections 66 thereof and only then is the blow mould carrier opened. In this way it is possible to ensure that the blow moulding device is kept safe at every point in time.

Figure 11:
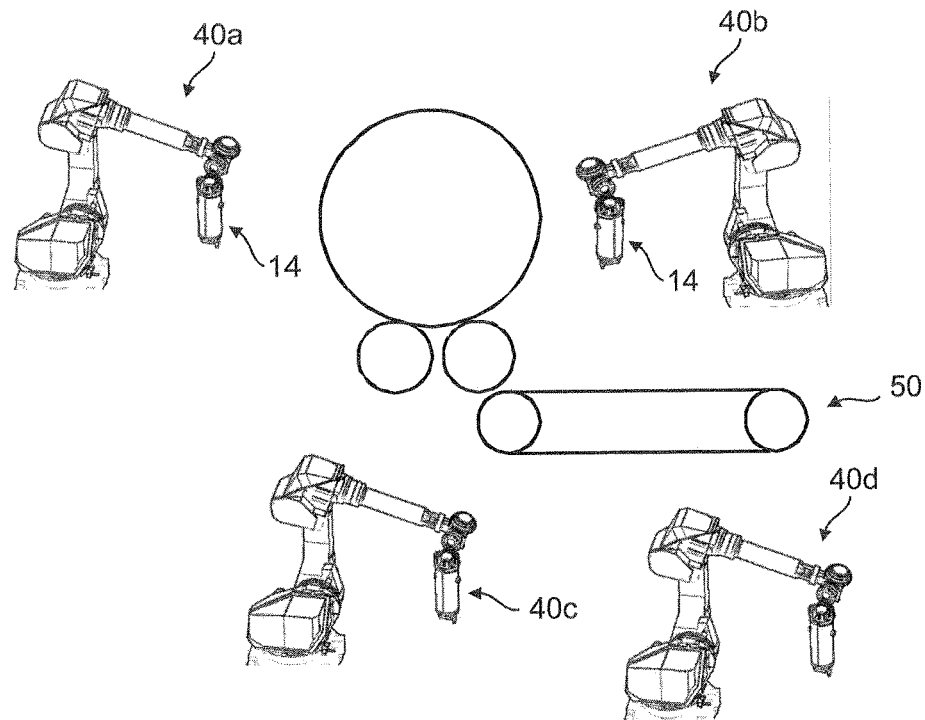
FIG. 11 is an illustration to explain possible positions of the changing device.

FIG. 11 is a further illustration of the present invention. In this case a plurality of changing devices 40a to 40d are provided, with which elements of the apparatus can be changed in each case. In this case it would be possible for example for two of the changing devices (40a, 40b) to be provided in order to change blow moulding devices 14, but also for further changing devices to be provided which exchange other elements, such as for example heating mandrels which are present in a furnace 50 for heating the plastics material pre-forms (the changing device 40d). In addition, with the changing device 40c shown it is also possible for example for holding elements, such as transfer grippers, to be changed, which convey the plastics material pre-forms to the shaping device 1 after their heating.

Figure 12:
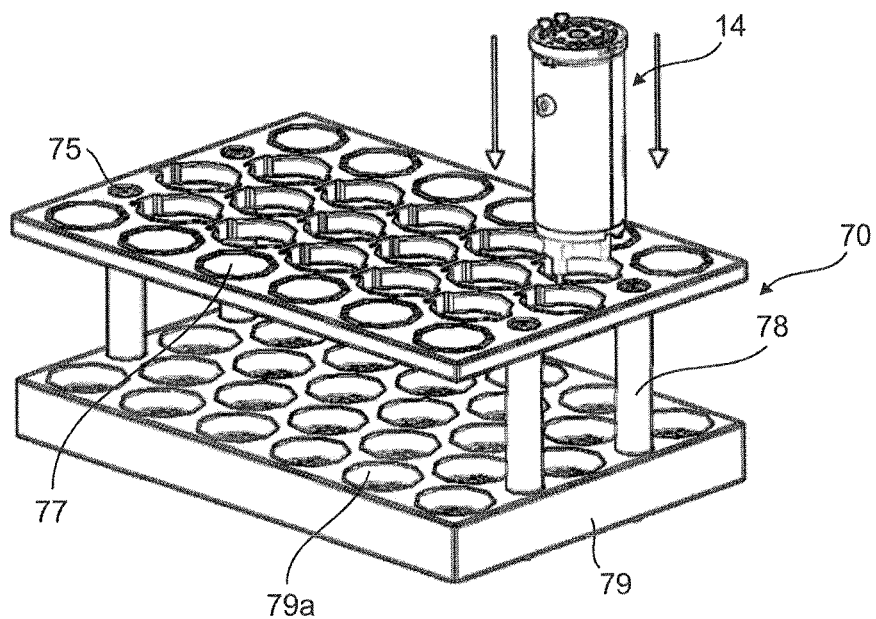
FIG. 12 is an illustration of a magazine with a blow moulding device.

FIG. 12 shows a receiving device such as a magazine for receiving the blow moulding devices 14. This can contain in this case a carrier plate 75 which has a plurality of openings 77. This plate 75 can be arranged on a base carrier 79 by means of carriers 78, this base carrier 79 in turn having openings 79*a* or holes respectively for receiving the blow moulding devices. It is advantageous for this magazine to have the same dimensions as a so-called Euro pallet and thus preferably dimensions in a range of 1200×800 mm. In this case the individual openings 79*a* are, as shown in FIG. 12, arranged in rows and are offset with respect to one another, so that as large as possible a number of blow moulding devices can be introduced into the pallet.

The Applicants reserve the right to claim all the features disclosed in the application documents as being essential to the invention, insofar as they are novel either individually or in combination as compared with the prior art.

LIST OF REFERENCES 1 apparatus/shaping device
6 base carrier
8 shaping stations
10 plastics material pre-forms
12 station carrier
14 blow moulding device
15 blow mould shell
15*a* supply and removal element for tempering medium
16 blow mould carrier
16*a* 16*b* blow mould carrier parts
18 housing
18*a* recess
20 plastics material containers
22 control device for controlling the changing device
32 wall
34 wall parts
40 changing device
40*a* to 40*d* changing device
42 control device for controlling the shaping device
46 detection device
50 furnace
52 gripping device
54 second pivotable arm
56 first pivotable arm
58 carrier
62 guide element
63 recess
64*a*, 64*b* projections
66 projections
70 magazine device
72 holes
74 carrier/pallet
75 carrier plate
77 openings
78 carrier
79 base carrier
79*a* openings/holes
82 locking device
D axis of rotation
B user
A1 to A6 axes
W changing position
R radial direction

The invention claimed is:

1. An apparatus for the shaping of plastics material pre-forms into plastics material containers with a conveying device which conveys the plastics material pre-forms along a pre-set conveying path, wherein the conveying device has a movable station carrier which is arranged at least indirectly on a stationary base carrier and on which are arranged a plurality of shaping stations, wherein these shaping stations have in each case blow moulding devices which form cavities in each case, inside which the plastics material pre-forms are capable of being shaped to form the plastics material containers and these blow moulding devices are arranged in each case on blow mould carriers, wherein the apparatus has a changing device which is suitable and intended for removing at least the blow moulding devices from the blow mould carriers thereof and/or for arranging blow moulding devices on the blow mould carriers, wherein the changing device has a first control device for controlling a removing movement of the blow moulding devices and/or an arranging movement for arranging the blow moulding device on the blow mould carriers for a changing procedure, and the apparatus has a second control device for controlling a blow moulding procedure, wherein the first control device and the second control device are linked to co-operate at least for a time during the changing procedure, so that when the second control device effects an opening of a blow moulding device during the changing procedure, a replacement of a blow mold by the first control device automatically occurs.

2. The apparatus according to claim 1, wherein the apparatus has a housing which surrounds at least the station carrier in the peripheral direction thereof.

3. The apparatus according to claim 2, wherein the changing device is capable of being displaced as a whole into a space surrounded by the housing.

4. The apparatus according to claim 1, wherein the changing device has at least one pivotable changing arm and it is preferably arranged at least indirectly on the base carrier.

5. The apparatus according to claim 1, wherein the changing device has a first control device for controlling a removal movement of the blow moulding devices and/or an arranging movement for the arrangement of the blow moulding device on the blow mould carriers, and the apparatus also has a second control device for controlling a blow moulding procedure, wherein one control device is incorporated in the other control device.

6. The apparatus according to claim 1, wherein the changing device has at least one gripping device for gripping the blow moulding devices.

7. The apparatus according to claim 1, wherein the changing device has at least one detection device for detecting at least one force acting upon at least one element of the changing device.

8. The apparatus according to claim 1, wherein the changing device has a serial or parallel kinematic arrangement with at least three axes of movement.

9. A method of operating a shaping device for the shaping of plastics material pre-forms into plastics material containers, wherein during working operation of the apparatus the plastics material pre-forms are conveyed along a pre-set conveying path using plurality of shaping stations and are expanded by being acted upon with a flowable medium to form the plastics material containers, wherein in order to expand the plastics material pre-forms use is made of blow moulding devices, in the interior of which the plastics material pre-forms are expanded to form the plastics material containers, wherein in a changing operation at least one of the blow moulding devices is removed from the apparatus and/or one of the blow moulding devices is arranged on a blow mould carrier of the apparatus, wherein a changing device is used to change the blow moulding devices, wherein a first control device controls a removal movement of the blow moulding devices and/or an arranging movement for the arrangement of the blow moulding device on the blow mould carriers for a changing procedure, and this first control device co-operates with a second control device for controlling a blow moulding procedure, at least for a time during the changing procedure, so that when the second control device effects an opening of a blow moulding device during the changing procedure, a replacement of a blow mold by the first control device automatically occurs.

10. The method according to claim 9, wherein the shaping stations are conveyed in working operation along a circulating conveying path and in the changing operation the blow moulding devices are removed in a pre-set and fixed position of the respective shaping station, the blow moulding device of which is to be removed, with respect to the circulating conveying path.

11. The apparatus according to claim 1, wherein the first control device and second control device are linked so that when the first control device effects a removal of a blow moulding device from the apparatus, a replacement of a blow moulding device occur automatically.

12. The apparatus according to claim 11, wherein the first control device is arranged to automatically change the blow mould.

13. The apparatus according to claim 1, wherein the apparatus includes a changing robot arranged in a shaping region of the apparatus.

14. The apparatus according to claim 1, wherein the apparatus further includes a changing device which is arranged on an intermediate carrier which intermediate carrier is in turn arranged on a base carrier of the conveying device.

15. The method according to claim 9, wherein the first control device and second control device are linked so that when the first control device effects a removal of a blow moulding device from the apparatus, a replacement of a blow moulding device occur automatically.

16. The method according to claim 15, wherein the first control device is arranged to automatically change the blow mould.

17. The method according to claim 9, wherein the apparatus includes a changing robot arranged in a shaping region of the apparatus.

18. The method according to claim 9, wherein the apparatus further includes a changing device which is arranged on an intermediate carrier which intermediate carrier is in turn arranged on a base carrier of the conveying device.

19. The method according to claim 9, including the step of detecting defective elements of the blow molding device by detecting at least one force acting upon the at least one element of the changing device.

* * * * *